Patented Jan. 23, 1934

1,944,346

UNITED STATES PATENT OFFICE 1,944,346

PROCESS OF VULCANIZING RUBBER

Walter Huhn, Cologne-Mulheim-on-the-Rhine, Germany, assignor to I. G. Farbenindustrie Aktiengesellschaft, Frankfort - on - the - Main, Germany No Drawing. Application March 1, 1933, Serial No. 659,171, and in Germany March 3, 1932

3 Claims. (Cl. 18—53)

The present invention relates to a process of vulcanizing rubber in the presence of at least two different vulcanization accelerators one of which is a thiuram sulfide not possessing tendency to prevulcanization.

There are known many vulcanization accelerators possessing strong accelerating properties but tending to prevulcanization of the vulcanization mixture.

It is the idea of the present invention to have found that vulcanization accelerators of this type can be handled without any danger of prevulcanization, when they are applied in admixture with a thiuram sulfide not possessing a tendency to prevulcanization. Thiuram sulfides of this latter type are, for example, dimethyl- or diethyldiphenylthiuram disulfides, tetrabutylthiuram disulfide, dipentamethylene thiuram monosulfide, dicyclohexyldiethylthiuram monosulfide, etc. As vulcanization accelerators possessing a tendency to prevulcanization there may be mentioned by way of example dithiocarbamates, such as the piperidine salt of piperidyl dithiocarbamate, the dimethylamine—or diethylamine salts of dimethyl- or diethyl-dithiocarbamic acid, the zinc salts of methylphenyl—or ethylphenyl dithiocarbamic acid etc.; furthermore, xanthogenates (zinc-butyl xanthogenate, di-isopropylxanthogene, for example), mercapto arylene thiazoles, such as mercapto benzo thiazole, mercapto benzo thiazoles, being substituted by halogen atoms, alkyl-, alkoxy groups, etc., finally, certain thiuram mono- or disulfides such as tetramethyl thiuram disulfide, etc.

The amount of the thiuram sulfide not tending to prevulcanization in comparison with that of the accelerator tending to prevulcanization may vary within the widest limits, mainly depending on the type of accelerators applied. Preferred amounts are those of about the 0.1 to about the 2 fold quantity of the first mentioned type of accelerators on 1 part by weight of the accelerator tending to prevulcanization.

As mentioned above, by the use of thiuram sulfides not tending to prevulcanization in admixture with other accelerators the result is obtained that the danger of prevulcanization of the vulcanization mixtures is removed or at least diminished to a substantial degree. On the other hand, the time after which vulcanization is complete is not prolonged in any way.

Means have thus become available to utilize the strong accelerating properties usually possessed by accelerators tending to prevulcanization without prevulcanization occurring. This result is surprising in so far as generally in a mixture of accelerators the single accelerators activate one another. Therefore, it was to be expected that in the present case the danger of prevulcanization would be increased, whereas in reality the contrary occurs.

The following examples illustrate the invention, without however, limiting it thereto, the parts being by weight:—

Example 1

Tests were carried out with the following mixtures:—

Mixture I 100.0 parts of rubber
2.5 parts of sulfur
5.0 parts of zinc oxide
0.3 parts of tetramethyl thiuram disulfide.

Mixture II

The ingredients of Mixture I+0.2 part of tetrabutylthiuram disulfide.

Mixture III

The ingredients of Mixture I+0.2 part of dipentamethylenethiuram monosulfide.

Mixture IV

The ingredients of Mixture I+0.2 part of diethyldiphenlythiuram disulfide.

Mixture V

The ingredients of Mixture I+0.2 part of dicyclohexyldiethylthiuram monosulfide.

| Heating | I | | II | | III | | IV | | V | |
|---|---|---|---|---|---|---|---|---|---|---|
| | A | B | A | B | A | B | A | B | A | B |
| Test of prevulcanization | | | | | | | | | | |
| 110° C. 40 minutes | 93 | 930 | Undervulcanized | | Undervulcanized | | Undervulc. | | 96 | 915 |
| 110° C. 45 minutes | 186 | 915 | 127 | 858 | 171 | 910 | | | | |
| 110° C. 50 minutes | 214 | 880 | 176 | 843 | 248 | 865 | 9 | 920 | 233 | 900 |
| Vulcanization tests—2 atm. pressure (superatmospheric) | | | | | | | | | | |
| 9 minutes | 186 | 875 | 205 | 850 | 217 | 815 | 146 | 820 | 211 | 855 |
| 12 minutes | 216 | 835 | 240 | 810 | 223 | 765 | 226 | 805 | 255 | 820 |
| 15 minutes | 223 | 830 | 233 | 805 | 233 | 795 | 233 | 815 | 243 | 815 |
| 20 minutes | 161 | 805 | 175 | 790 | 171 | 770 | 158 | 790 | 177 | 795 |

A=tensile strength in kg/cm².
B=elongation in %.

Example 2

Tests were carried out with the following mixtures:—

*Mixture I*

100.0 parts of rubber
2.5 parts of sulfur
5.0 parts of zinc oxide
0.3 part of di-(perhydromethylindol)-thiuram disulfide of the formula:—

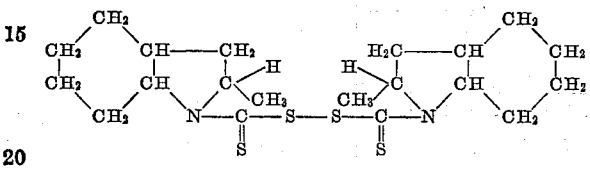

*Mixture II*

The ingredients of Mixture I+0.2 part of diethyldiphenylthiuram disulfide.

| Heating | I | | II | |
|---|---|---|---|---|
| | A | B | A | B |
| Test of prevulcanization | | | | |
| 110° C. 20 minutes | 37 | 1100 | Undervulcanized | |
| 110° C. 40 minutes | 211 | 955 | 9 | 870 |
| Vulcanization tests—(2 atmosph. pressure (superatmospheric)) | | | | |
| 9 minutes | 160 | 890 | 158 | 875 |
| 12 minutes | 239 | 905 | 270 | 840 |
| 15 minutes | 239 | 865 | 282 | 835 |
| 20 minutes | 217 | 825 | 223 | 830 |

A=tensile strength in kg/cm².
B=elongation in %.

The following examples yield proof that mixtures of vulcanization accelerators tending to prevulcanization and not belonging to the class of thiuram sulfides yield likewise good results when applied in admixture with thiuram sulfides not tending to prevulcanization. Dithiocarbamates, for example, generally are vulcanization accelerators of excellent properties. However, their use is confined in view to the fact that vulcanization mixtures containing the said accelerators show prevulcanization when stored at 50–70° C. after some hours or after some minutes when heated to a temperature of about 100° C. When adding thiuram sulfides not tending to prevulcanization to accelerators of the dithiocarbamate class, the tendency to prevulcanization is removed or at least diminished to a far reaching degree. However, when heating the vulcanization mixtures to temperatures usually applied in vulcanization processes, the thiuram sulfide not possessing tendency to prevulcanization acts to activate the accelerator of the dithiocarbamate class, with the result that vulcanization is complete in a remarkable short time. Furthermore, in many cases the use of thiuram sulfides not possessing tendency to prevulcanization in combination with accelerators tending to prevulcanization renders the effect that a remarkable small amount of accelerators can be used to bring about a sufficient accelerating power without the danger of prevulcanization occurring.

Example 3

Tests were carried out with the following mixtures:—

| | Mixture I | Mixture II | Mixture III |
|---|---|---|---|
| Light crepe | 100.0 | 100.0 | 100.0 |
| Sulfur | 2.5 | 2.5 | 2.5 |
| Zinc oxide | 5.0 | 5.0 | 5.0 |
| Dithiocarbamate ° | 0.3 | 0.3 | 0.15 |
| Dimethyl-diphenylthiuram disulfide | | 0.3 | 0.3 |

° The piperidine salt of piperidyldithiocarbamic acid.

| Heating | I | | II | | III | |
|---|---|---|---|---|---|---|
| | A | B | A | B | A | B |
| 3 minutes | 59 | 935 | Undervulcanized. | | Undervulcanized. | |
| 6 minutes | 93 | 900 | 127 | 833 | Undervulcanized. | |
| 10 minutes | 105 | 850 | 189 | 787 | Undervulcanized. | |
| 15 minutes | 183 | 850 | 260 | 788 | Undervulcanized. | |
| 20 minutes | 160 | 800 | 260 | 758 | 155 | 880 |
| 30 minutes | 171 | 753 | 257 | 755 | 229 | 802 |
| 45 minutes | 180 | 724 | 273 | 775 | 264 | 798 |
| 60 minutes | 225 | 742 | 223 | 730 | 254 | 806 |

Temperature of vulcanization=110° C.
Tensile strength in kg/cm²=A.
Elongation in %=B.

The tensile strength and the elongation values of the vulcanization products obtained show clearly that the effect obtained by the combined use of accelerators of the different types in question by far surmounts the effect which could be expected regarding the single accelerators contained in the mixture. The great advantage of the dithiocarbamate accelerator—to yield valuable vulcanization products in a short time and at rather low temperatures—is not impaired but even increased by the addition of the thiuram sulfide not possessing tendency to prevulcanization, whereas the tendency to prevulcanization is substantially diminished by the addition of the accelerators last mentioned.

Example 4

Tests were carried out with the following mixtures:—

*Mixture I*

100.0 parts of rubber
3.0 parts of sulfur
5.0 parts of zinc oxide
2.0 parts of stearic acid
0.8 part of mercaptobenzothiazole

*Mixture II*

The ingredients of Mixture I+0.3 part of dimethyl-diphenyl thiuram disulfide.

| Heating | I | | II | |
|---|---|---|---|---|
| | A | B | A | B |
| Test of prevulcanization | | | | |
| 20 minutes | 9 | 1020 | Undervulcanized. | |
| 30 minutes | 76 | 1175 | 9 | 945 |
| 45 minutes | 129 | 1050 | 237 | 770 |
| Vulcanization tests (at 142.8° C.) | | | | |
| 5 minutes | *99 | 940 | 213 | 720 |
| 10 minutes | *180 | 920 | 228 | 740 |
| 15 minutes | 204 | 875 | 210 | 720 |
| 20 minutes | 186 | 830 | 191 | 725 |

*=Separation of sulfur
Temperature of vulcanization=110° C.
Tensile strength in kg/cm²=A.
Elongation in %=B.

Instead of the dimethyl-diphenyl-thiuram disulfide mentioned in this example, other thiuram sulfides not possessing tendency to prevulcanization may be applied, such as diethyl-diphenyl-thiuram disulfide, tetrabutylthiuram disulfide etc.

EXAMPLE 5

Tests were carried out with the following mixtures:—

*Mixture I*

100.0 parts of rubber
2.5 parts of sulfur
5.0 parts of zinc oxide
1.0 part of di-isopropyl-dixanthogene

*Mixture II*

The ingredients of Mixture I+0.2 part of dimethyl-diphenyl-thiuram disulfide.

| Heating | I | | II | |
|---|---|---|---|---|
| | A | B | A | B |
| 45 minutes | 100 | 945 | Not Vulcanized | |
| 60 minutes | 202 | 862 | 202 | 750 |
| 75 minutes | 202 | 860 | 221 | 760 |
| 90 minutes | 204 | 875 | 230 | 777 |

Temperature of vulcanization=110° C.
Tensile strength in kg/cm$^2$=A.
Elongation in %=B.

Any other accelerator possessing tendency to prevulcanization with the exception of the accelerators of the class of aldehyde amine condensation products, may be applied in combination with a thiuram sulfide not tending to prevulcanization with the result outlined above.

As can be seen from the examples, a vulcanizing agent should always be present in the vulcanization process. In the examples sulfur has been applied as the vulcanizing agent. It may be replaced, however, by other vulcanizing agents, such as compounds being capable of splitting off sulfur under the conditions of working, selenium, aromatic nitro compounds + metal oxides etc.

Furthermore, the natural rubber may be replaced by synthetic rubber-like masses as are obtainable, for example, by polymerizing butadiene hydrocarbons (butadiene, isoprene, 2.3-dimethyl-butadiene etc.) alone or in admixture with one another or with other polymerizable compounds, such as styrene, vinylnaphthalene, acrylic acid or derivatives thereof (esters, nitrile) unsaturated ketones etc.

The term "rubber" as used herein and in the appended claims is therefore intended to embrace natural rubber as well as synthetic rubber-like masses.

I claim:—

1. The process which comprises incorporating within rubber a vulcanizing agent, a thiuram sulfide not tending to prevulcanization and a vulcanization accelerator tending to prevulcanization other than an aldehyde amine condensation product, and vulcanizing the mixture.

2. The process which comprises incorporating with rubber sulfur, a thiuram sulfide not tending to prevulcanization and a vulcanization accelerator tending to prevulcanization other than an aldehyde amine condensation product, and vulcanizing the mixture.

3. The process which comprises incorporating with rubber sulfur, a thiuram sulfide not tending to prevulcanization and a vulcanization accelerator tending to prevulcanization other than an aldehyde amine condensation product, and vulcanizing the mixture, the thiuram sulfide not tending to prevulcanization being applied in an amount corresponding to about the 0.1 to 2 fold quantity of the accelerator tending to prevulcanization applied.

WALTER HUHN.